INVENTOR.
KENNETH A. ANDERSON
ERNIE G. SEGGEBRUCH
BY
Robertson & Smythe
ATTORNEYS … # 3,077,988
FILTER DETECTOR
Kenneth A. Anderson, Silvis, and Ernie G. Seggebruch, Moline, Ill., assignors to Ametek, Inc., New York, N.Y., a corporation of Delaware
Filed Nov. 2, 1960, Ser. No. 66,769
3 Claims. (Cl. 210—86)

This invention relates to detectors and particularly to a means for detecting the thickness of a filter cake.

A common form of industrial filter is the type employing a plurality of leaves positioned within a tank. The liquid to be filtered is admitted into the tank and upon passing through the filter leaves, the material to be removed is deposited upon their outer surfaces. The interior portion of the leaves is connected to the discharge side of the filter from which the filtered liquid passes. During operation the material being filtered from the liquid builds up in the form of a cake upon the outer surfaces of the filter leaves. As the filter cake accumulates the pressure drop through the cake to the interior of the leaves increases with the result that inwardly directed forces are applied to the leaves. In order to maintain proper filtering action and to protect the leaves from destructive loading, the operation of the filter must be periodically terminated and the leaves cleaned of the accumulated filter cake.

The time at which the cleaning must take place can be estimated in a rough manner from the duration of time during which the filter has been in operation. Efforts at more precise detection of the filter cake thickness have been based upon measurements of the differential pressure across the filter cake to the interior of the filter leaves.

These methods of detection of the filter cake build-up have not been completely satisfactory. The method based upon the duration of the operation of the filter is in many cases too inaccurate to be practical. As far as detection devices based upon the differential pressure, these are subject to pressure conditions which can give erroneous indication.

One of the objects of the invention is the detection of the build-up of filter cake on the outer surfaces of filter leaves.

Another object of the invention is the detection of the thickness of filter cake on the outer surfaces of filter leaves.

In one aspect of the invention the agitator means is positioned adjacent to the surface of a filter leaf and is moved with respect to the surface. Additional means are provided for indicating the response of the means for moving the agitator when the filter cake contacts the agitator.

In another aspect of the invention the agitator is driven by an electric motor and the change of current to the motor accompanying the build-up of the filter cake in contact with the agitator serves as the means of indication.

In still another aspect of the invention, a motor is employed to move the agitator and upon accumulation of the filter cake in contact with the agitator, the reactive torque of the motor is sufficient to move it and thereby indicate the build-up of the filter cake.

These and other objects, advantages and features of the invention will become apparent from the following description and drawings which are merely exemplary.

Figure 1:
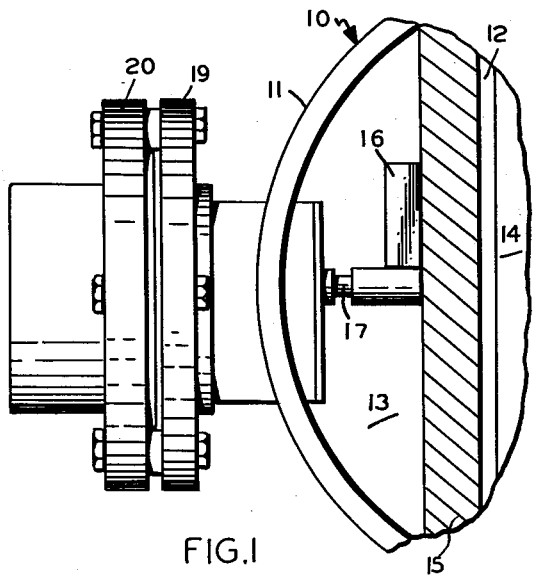
FIGURE 1 is a fragmentary sectional view of the filter cake detector's agitator means adjacent the surface of a filter leaf.
Figure 4:
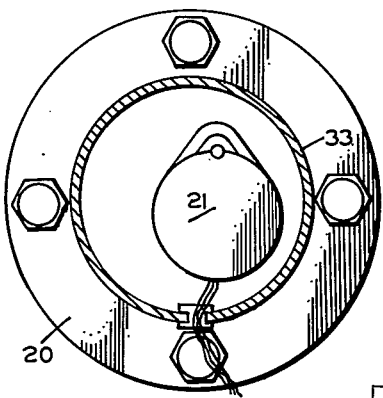
FIG. 4 is a sectional view of the end portion of the detector adjacent to the motor.

Filter 10 includes a housing 11 in which is located a multiplicity of filter leaves 12 (FIG. 1). The liquid to be filtered is introduced under pressure into the interior portion 13 of housing 11 and is forcing through the outer surfaces of filter leaves 12 into their interior portions 14 from which the filtered liquid is removed. During operation the flow of the fluid through filter leaves 12 results in the build-up of filter cake 15 on their outer surfaces.

The filter cake thickness detector includes vane 16 mounted upon shaft 17 at a predetermined distance from the outer surface of filter leaf 12. Vane 16 extends at substantially right angles to shaft 17 which in turn may be positioned substantially at right angles to the outer surface of filter leaves 12.

Figure 3:
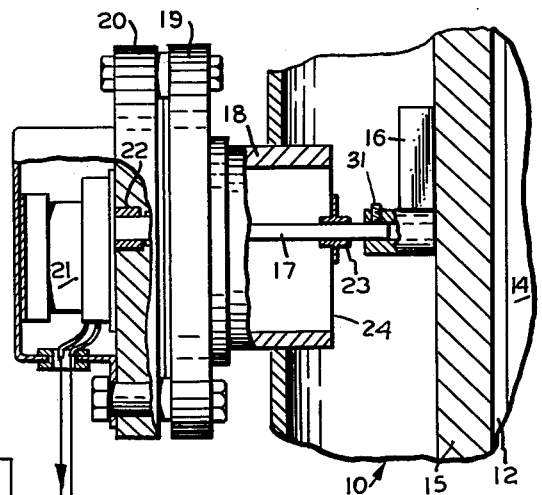
FIG. 3 is a fragmentary sectional view of the agitator adjacent the surface of a filter leaf and also a schematic representation of the detection circuitry for the agitator motor.

Shaft 17 (FIG. 3) extends through housing 18 which is mounted in an opening in housing 11. Housing 18 is provided with flange 19 to which is attached flange 20 of motor 21. The end of shaft 17, opposite that to which vane 16 is attached, is coupled to motor 21 and is supported by bearing 22 within flange 20. The end of shaft 17 adjacent to vane 16 is supported by bearing 23 mounted in cover plate 24 which serves to close the opening of housing 18.

Motor 21 is energized by power supply 25 through line 26 and through line 27 which is in series with current sensitive relay 28 and line 29. Current sensitive relay 28 is adapted to be actuated by a predetermined level of current passing through it. The output circuit of relay 28 can be connected to an indicator or alarm device 30.

Prior to operating the filter, vane 16 is positioned along shaft 17 so that the vane is spaced from the surface of filter leaf 12 at a predetermined distance which corresponds to the acceptable degree of build-up of the filter cake. The vane 16 may be locked in position on shaft 17 by means of set screw 31. At this point the filter may be placed in operation and at the same time motor 21 may be energized so as to rotate vane 16 in a plane substantially parallel to the surface of filter leaf 12. As operation of the filter continues, filter cake 15 accumulates in the direction of the rotating vane. In time the filter cake builds up to such an extent that it contacts the rotating vane. It is evident that contact of the filter cake with the vane increases the load upon motor 21 which then will draw a greater amount of electrical current from power supply 25. By empirical methods, motor currents corresponding to known accumulations of the filter cake may be determined. Current relay 28 is then adjusted to be actuated by a motor current corresponding to the maximum desired build-up of the filter cake. Thus, as this level of filter cake contacts the rotating vane, the increased current to motor 21 will trigger current relay 28 which then can energize alarm or indicating device 30, at which point the operator is aware that filter 10 must be serviced.

Figure 2:
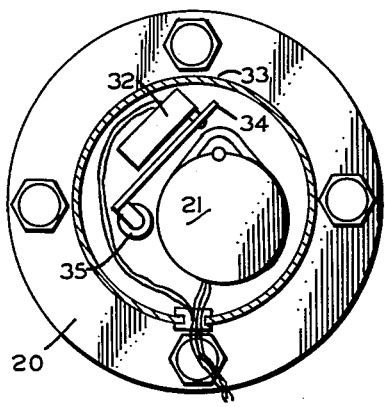
FIG. 2 is a sectional view of the agitator motor and the detection switch adjacent to it.

Another form of the detection means for the build-up of the filter cake is based upon the reactive torque of motor 21 when vane 16 contacts the filter cake. Motor 21 can be mounted with respect to flange 20 so that upon a predetermined reactive torque, relative motion may occur between motor 21 and flange 20 (FIG. 2). For the case where the motor shaft is disposed in a substantially horizontal direction, motor 21 may be made pendulous in order to resist the reactive torque during normal operation. In this arrangement, with motor 21 is rotating vane 16, the pendulosity is sufficient to restrain motor 21 from movement relative to flange 20 until a predetermined reactive torque is present. The predetermined level of reactive torque is that reached when vane 16 encounters a predetermined build-up of filter cake 15. At this point the reactive torque of the motor overcomes the restraint of its pendulosity with the result that the motor moves with respect to flange 20.

Means are provided to sense the relative motion between motor 21 and flange 20. Such means may include switch 32 mounted upon flange 20 within cover 33 which encloses motor 21. Switch 32 is provided with arm 34 and follower 35 which is adapted to be engaged by motor 21 in order to actuate switch 32 as motor 21 moves with respect to flange 20. Switch 32 may be used to control any suitable alarm or indicating device.

It should be apparent that variations may be made in the construction as needed without departing from the spirit of the invention except as defined in the appended claims.

What is claimed is:

1. In a filter, a housing; filter surface means within said housing adapted to have filter cake collected thereon; vane means mounted in said housing and set at a predetermined distance from said filter surface means, said vane means being rotated within a plane substantially parallel to that including said filter surface means; power means independent of said filter surface means for rotating said vane means; indicating means; and means responsive to the torque developed by the engagement between said vane means and cake on said filter surface means for operating said indicating means.

2. In a filter, a housing; a filter surface means within said housing adapted to have filter cake collected thereon; vane means mounted in said housing and set at a predetermined distance from said filter surface means, said vane means being rotated within a plane susbtantially parallel to that including said filter surface means; electric motor means connected to said vane means; indicating means; and means responsive to the increase in current flow through said electric motor means incident to the increased load on said motor means when said vane means is engaged by the cake on said filter surface means for operating said indicating means.

3. In a filter, a housing; filter surface means within said housing adapted to have filter cake collected thereon; vane means mounted in said housing and set at a predetermined distance from said filter surface means, said vane means being rotated within a plane substantially parallel to that including said filter surface means; electric motor means connected to said vane means and mounted for pivotal movement when an increased load is applied to said motor means; and indicating switch means rendered effective when said motor means pivots incident to an increased load being applied to it by the engagement between said vane means and cake on said filter surface means.

References Cited in the file of this patent
UNITED STATES PATENTS

| | | |
|---|---|---|
| 2,569,890 | Hicks | Oct. 2, 1951 |
| 2,585,006 | Graner et al. | Feb. 12, 1952 |
| 2,799,397 | Berline | July 16, 1957 |
| 2,855,101 | Scott | Oct. 7, 1958 |